(12) United States Patent
Lee

(10) Patent No.: US 10,272,634 B2
(45) Date of Patent: Apr. 30, 2019

(54) CLOTH HAVING GAS SHEET

(71) Applicant: Sang Geun Lee, Gwangju-si (KR)

(72) Inventor: Sang Geun Lee, Gwangju-si (KR)

(73) Assignees: Sang Geun Lee, Gwangju-si (KR); Chae Eun Lee, Gwangju-si (KR); Ji Ah Lee, Gwangju-si (KR)

( * ) Notice: Subject to any disclaimer, the term of this patent is extended or adjusted under 35 U.S.C. 154(b) by 419 days.

(21) Appl. No.: 15/139,343

(22) Filed: Apr. 27, 2016

(65) Prior Publication Data
US 2016/0332414 A1 Nov. 17, 2016

(30) Foreign Application Priority Data

May 12, 2015 (KR) .................. 10-2015-0066066

(51) Int. Cl.
*B32B 3/26* (2006.01)
*A41D 13/012* (2006.01)
(Continued)

(52) U.S. Cl.
CPC ............ *B32B 3/26* (2013.01); *A41D 13/0125* (2013.01); *A41D 31/065* (2019.02); *A41D 31/085* (2019.02); *A41D 31/285* (2019.02); *A62B 17/003* (2013.01); *B32B 3/12* (2013.01); *B32B 5/00* (2013.01); *B32B 5/02* (2013.01); *B32B 5/024* (2013.01); *B32B 5/04* (2013.01); *B32B 5/08* (2013.01); *B32B 5/26* (2013.01); *B32B 7/05* (2019.01); *B32B 25/08* (2013.01); *B32B 25/10* (2013.01); *B32B 27/08* (2013.01); *B32B 27/12* (2013.01); *B32B 27/304* (2013.01); *B32B 27/308* (2013.01); *B32B 27/32* (2013.01);
(Continued)

(58) Field of Classification Search
CPC .. B32B 3/26; B32B 5/024; B32B 5/04; B32B 5/26; B32B 27/304; B32B 27/32; B32B 27/325; B32B 27/40; B32B 5/00; B32B 5/02; B32B 5/08; B32B 7/045; B32B 25/08; B32B 25/10; B32B 27/08; B32B 27/12; B32B 27/308; B32B 3/12; B32B 2305/02; B32B 2307/306; B32B 2307/51; B32B 2307/72; B32B 2307/7265; B32B 2437/00; B32B 2571/00; B32B 2255/02; A41D 31/0027; A41D 31/0038; A41D 31/005; A41D 13/0125
See application file for complete search history.

(56) References Cited

U.S. PATENT DOCUMENTS 7,337,709 B2 * 3/2008 Sanderson ............ A23B 7/144
99/467

FOREIGN PATENT DOCUMENTS

GB 2507325 * 4/2014
KR 10-0549545 B1 2/2006
(Continued)

Primary Examiner — Cephia D Toomer
(74) Attorney, Agent, or Firm — Korus Patent, LLC; Seong II Jeong

(57) ABSTRACT

The present disclosure provides a cloth comprising: a gas sheet having multiple individual gas cells formed therein, each cell having substantially a sphere shape, the gas sheet being made of an elastic material to having a good stretchability, each gas cell having a gas filled therein, species of the gas corresponding to an application of the cloth, the gas cells being continuously connected in a matrix form; and an inshell and an outshell attached to inner and outer sides of the gas sheet respectively.

10 Claims, 4 Drawing Sheets

(51) Int. Cl.
*A62B 17/00* (2006.01)
*B32B 5/02* (2006.01)
*B32B 5/04* (2006.01)
*B32B 5/26* (2006.01)
*B32B 27/30* (2006.01)
*B32B 27/32* (2006.01)
*B32B 27/40* (2006.01)
*B32B 5/00* (2006.01)
*B32B 5/08* (2006.01)
*B32B 25/08* (2006.01)
*B32B 25/10* (2006.01)
*B32B 27/08* (2006.01)
*B32B 27/12* (2006.01)
*B32B 3/12* (2006.01)
*B32B 7/05* (2019.01)
*A41D 31/06* (2019.01)
*A41D 31/08* (2019.01)
*A41D 31/28* (2019.01)

(52) U.S. Cl.
CPC ............ *B32B 27/325* (2013.01); *B32B 27/40* (2013.01); *B32B 2255/02* (2013.01); *B32B 2255/24* (2013.01); *B32B 2262/02* (2013.01); *B32B 2262/0269* (2013.01); *B32B 2262/14* (2013.01); *B32B 2274/00* (2013.01); *B32B 2305/02* (2013.01); *B32B 2307/306* (2013.01); *B32B 2307/51* (2013.01); *B32B 2307/54* (2013.01); *B32B 2307/72* (2013.01); *B32B 2307/726* (2013.01); *B32B 2307/7265* (2013.01); *B32B 2307/73* (2013.01); *B32B 2437/00* (2013.01); *B32B 2571/00* (2013.01)

(56) References Cited

FOREIGN PATENT DOCUMENTS

| | | |
|---|---|---|
| KR | 20-2009-0005628 U | 6/2009 |
| KR | 10-0964968 B1 | 6/2010 |
| KR | 10-2012-0058837 A | 6/2012 |

* cited by examiner

CLOTH HAVING GAS SHEET

CROSS-REFERENCE TO RELATED APPLICATION

This application claims the benefit of Korea Patent Application No. 10-2015-0066066 filed on, May 12, 2015, the entire content of which is incorporated herein by reference for all purposes as if fully set forth herein.

BACKGROUND

Field of the Present Disclosure

The present disclosure relates to a cloth including a gas sheet having multiple individual gas cells formed therein. More particularly, the present disclosure relates to a cloth including a gas sheet having multiple individual gas cells formed therein, each cell having substantially a sphere shape, each cell having a carbonic acid gas or helium gas filled therein, wherein each cell may be ruptured or maintained, if desired, in use, wherein the present cloth may be employed for firefighter clothes or lifesaving clothes.

Discussion of the Related Art

The firefighter should wear heat-proof clothes to protect his body from an extremely hot temperature. Further, a lifeguard for saving a person in water should wear waterproof clothes to prevent the water from penetrating into the clothes. For example, the firefighter clothes may include an outshell, a middle layer, an inshell, and a felt pursuant to a special firefighter clothes standard specification.

The outshell should be made entirely of a woven textile of PBI (polybenzimidazole) based fibers, PBO (Polybenz oxazole) based fibers, or equivalent higher-graded fibers. In an alternative, the outshell should be made partially (at least 30%) of a woven textile of PBI (polybenzimidazole) based fibers, PBO (Polybenz oxazole) based fibers, or equivalent or higher-graded fibers, and the remaining portion may be made of aramid-based fibers or equivalent higher-graded fibers. The texture type of the outshell should be a rip-stop. Further, the middle layer, inshell, and felt should have good heat-resistance and water-proof properties. The inshell should be made of aramid-based fibers or equivalent higher-graded fibers to be soft and have a good sweat-absorption. When the felt is attached to the middle layer or inshell, the felt should be made of the same material as that of the middle layer or inshell.

This firefighter clothes with the water-proof and heat-resistance should have a standard specification in terms of a heat-resistance, a weight, an inshell cleaning time, a textile cost, etc. Currently, a domestic standard or an international NFPA standard for the firefighter clothes has details about the specification thereof.

The conventional firefighter clothes may have a layer configuration including the outshell, middle layer, inshell and felt, thereby to allow the heat-resistance performance in some degree. However, the heat-resistance performance exhibited by the conventional firefighter clothes may fall short of a heat-resistance performance specified by the NFPA standard. This may lead to a fire-damage of the firefighter in the event of fire. When using the water-proof stack configuration including the inshell/felt/water-proof textile layer, the water-proof performance thereof may not be good, leading to uncomfortable wearing feeling and, thus, low efficient activity of the wearer. Further, since the felt is similar to cotton, the felt may cause a drying time after washing the firefighter clothes to be at least three days.

In order to solve the above problems, Korean patent number 10-0964968 tilted as "inner cloth having air cells for firefighter clothes and firefighter clothes including the same" is disclosed. In this document, the inner cloth includes a stack of a heat-resistant felt, a porous polyurethane sheet having multiple air cells formed therein, each air cell containing bubbles, and an aramid cloth made of heat-resistant aromatic polyamide-based fibers in this order. However, the air cells may have poor cushioning ability, and may have a lower heat-resistance because they do not contain a gas with good cooling performance.

Further, the conventional lifesaving clothes may have a thick synthetic resin filled therein, leading to uncomfortable wearing feeling and lowered air content. Thus, the conventional lifesaving clothes may have a poor floating performance. Further, the conventional lifesaving clothes may not be easily flexible, leading to a lowered activity freedom of the lifeguard.

Prior art documents may be as follows: Korean patent number 10-0964968, Korean patent application laid-open number 10-2012-0058837, Korean patent number 10-0549545.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY

From considerations of the above situations, the present disclosure provides a cloth including a gas sheet having multiple individual gas cells formed therein, each cell having substantially a sphere shape, each cell having a carbonic acid gas or helium gas filled therein, the gas sheet having a good stretchability, wherein each cell may be ruptured or maintained, if desired, wherein the present cloth may be employed for firefighter clothes or lifesaving clothes or may have different applications.

In an aspect of the present disclosure, there is provided a cloth comprising: a gas sheet having multiple individual gas cells formed therein, each cell having substantially a sphere shape, the gas sheet being made of an elastic material and having a stretchability of about 200 to 800%, each gas cell having a gas filled therein, species of the gas corresponding to an application of the cloth, the gas cells being continuously connected in a matrix form; and an inshell and an outshell attached to inner and outer sides of the gas sheet respectively, wherein textile species of the inshell and outshell correspond to an application of the cloth.

In one embodiment, the elastic material may include at least one selected from a group consisting of a rubber, a synthetic rubber, a synthetic rubber, an oil-resistant rubber, a heat-resistant rubber, a butyl rubber, a thiocol rubber, a chloro-sulfonated polyethylene rubber, a polyurethane rubber, an acryl rubber, a silicon rubber, a viton rubber, a EPDM (Ethylene Propylene Diene Monomer) rubber, a polyurethane resin, a acryl resin, a silicon resin, a polyethylene resin, a polypropylene (PP) resin, a polyvinyl chloride (PVC) resin, and a polystyrene (CPS) resin.

In one embodiment, each gas cell may have a spheric hollow gas cell film to define a gas receiving space therein, wherein a thickness of the spheric hollow gas cell film may be in a range between about 0.05 mm and about 0.9 mm, wherein a diameter of each gas cell may be in a range between about 2 mm and about 15 mm.

In one embodiment, the species of the gas may include a carbonic acid gas, wherein the textile species of the inshell may include a fabric, and the textile species of the outshell may include a woven textile of heat-resistance fibers.

In one embodiment, the species of the gas may include a helium gas, wherein the textile species of the inshell may include a fabric, and the textile species of the outshell may include a water-proof fabric.

In one embodiment, the outshell may be made at least 30% of a woven textile of PBI (polybenzimidazole) based fibers, PBO (Polybenz oxazole) based fibers, or equivalent higher-graded fibers, and the inshell may be made of aramid-based fibers or equivalent higher-graded fibers to be soft and have a good sweat-absorption.

In one embodiment, the inshell may be made of aramid-based fibers or equivalent higher-graded fibers to be soft and have a good sweat-absorption, and the outshell may be made of a floating and/or water-proof woven textile. In case of the floating textile, the outshell may be made of a woven textile of water-floating fibers including core fibers having a larger specific gravity than water, and coating layers on the core fibers, the coating layers containing at least about 90 to 99% of a water-floating material.

In accordance with the present disclosure, in an event of the fire, the cells of the present cloth may be ruptured, and, thus, the carbonic acid gas may be discharged out of the cell to act as the heat-blocking agent or cooling agent. Further, when the present cloth is used for the lifeguard clothes or life jacket, the helium gas in the cell may be maintained to act as the water-floating agent to facilitate the person wearing the clothes to be floated on the water.

BRIEF DESCRIPTIONS OF THE DRAWINGS

The accompanying drawings included to provide a further understanding of the present disclosure illustrate embodiments of the present disclosure.

Figure 2A:
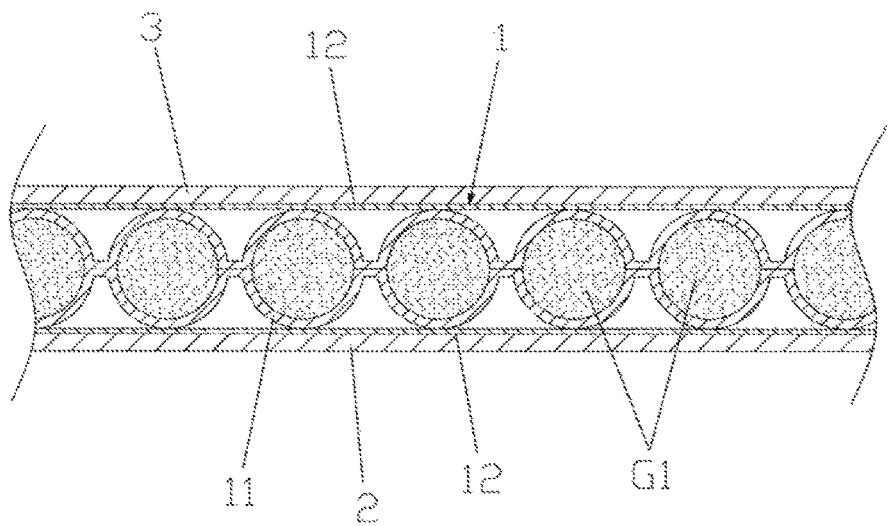
FIG. 2A shows a cross-sectional view of a cloth including a gas sheet having multiple individual gas cells formed therein in accordance with one embodiment of the present disclosure.
Figure 2B:
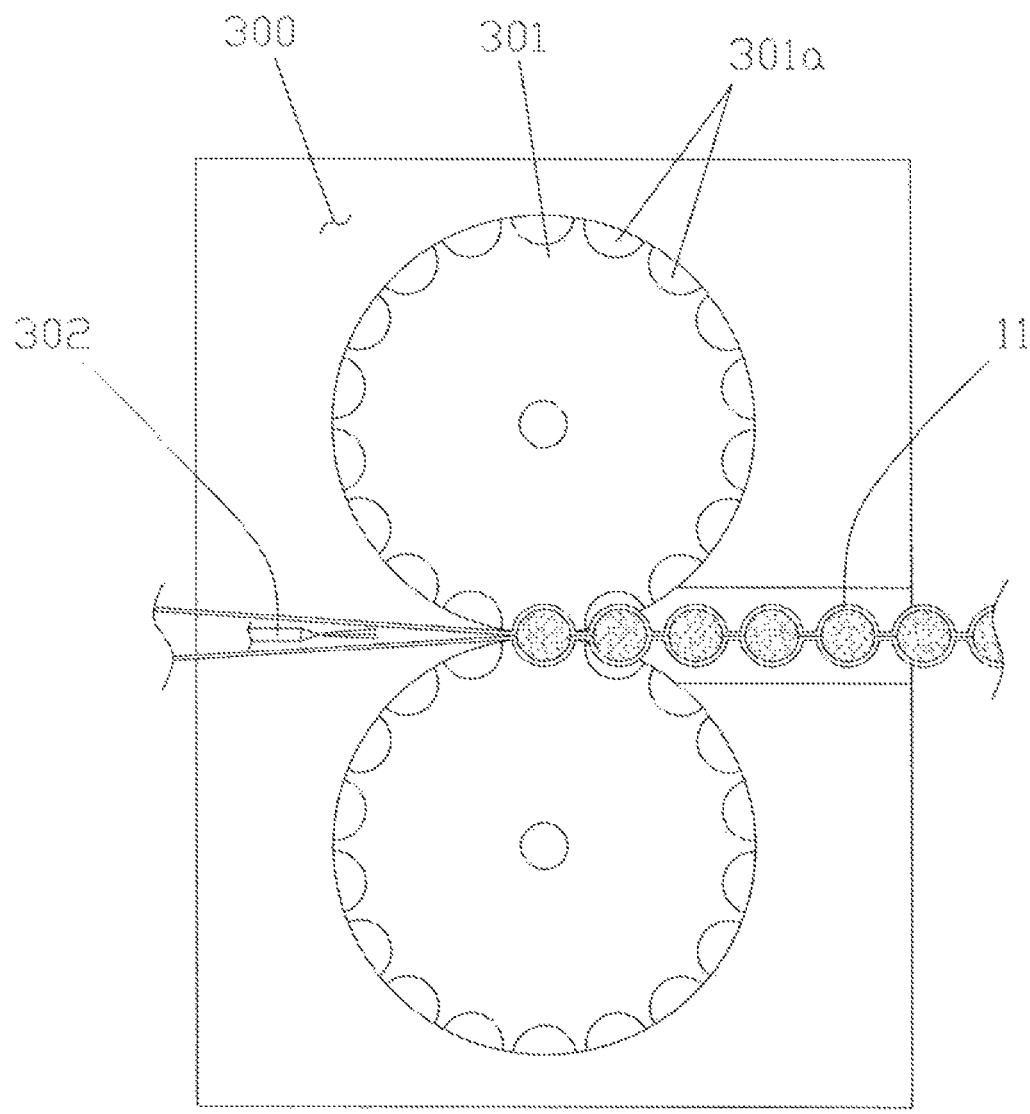

FIG. 2B schematically shows a mechanism for forming multiple individual gas cells in accordance with one embodiment of the present disclosure.

Figure 1:
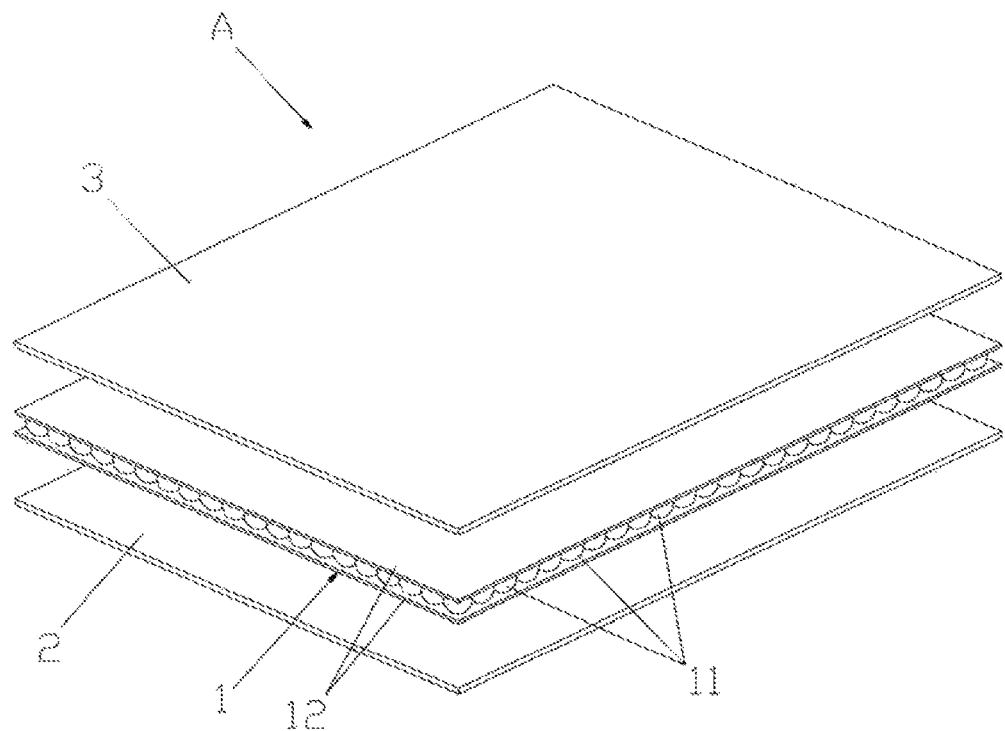
FIG. 1 shows an exploded perspective of a cloth including a gas sheet having multiple individual gas cells formed therein in accordance with one embodiment of the present disclosure.
Figure 3:
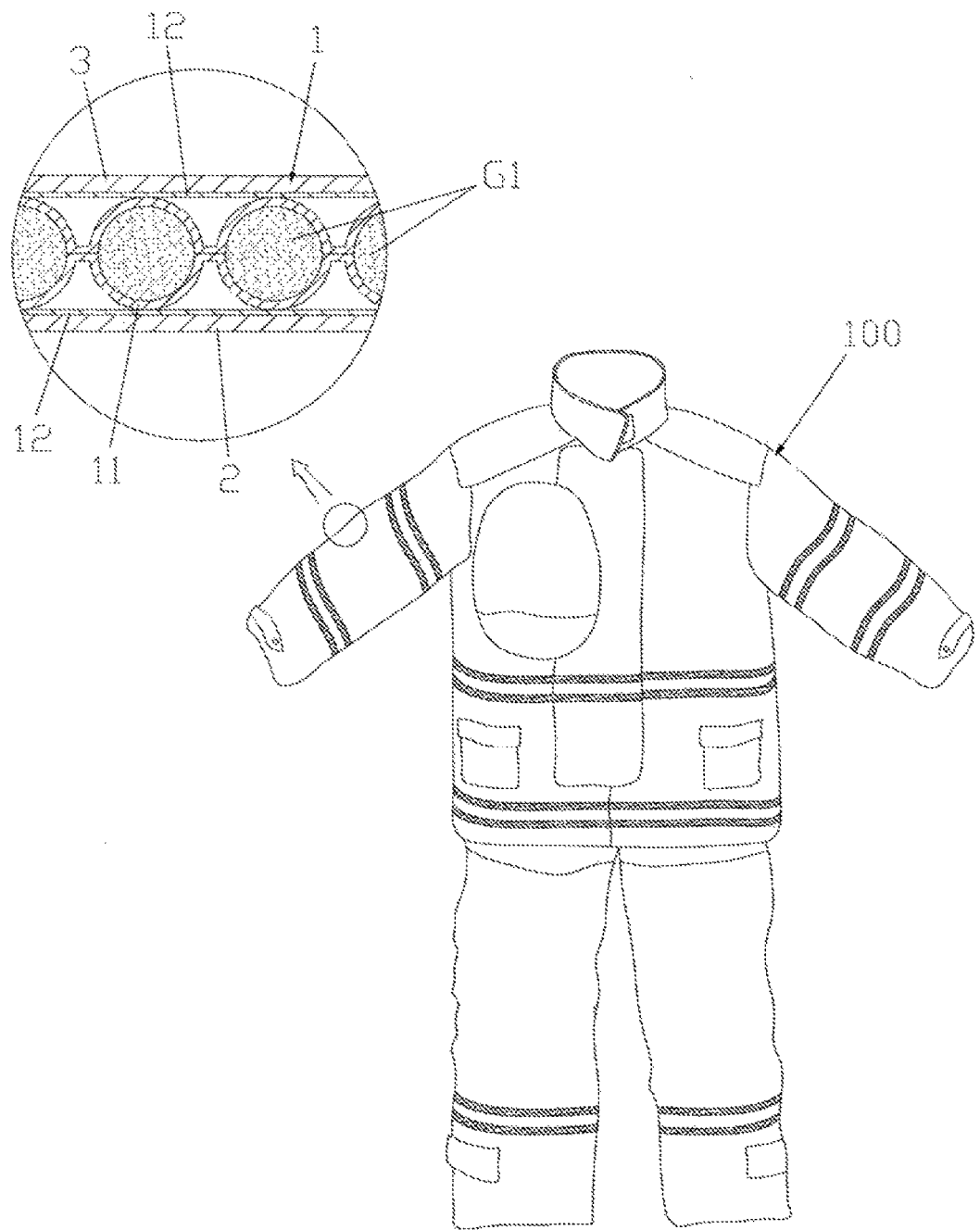

FIG. 3 shows firefighter clothes including the present cloth in FIG. 1.

Figure 4:
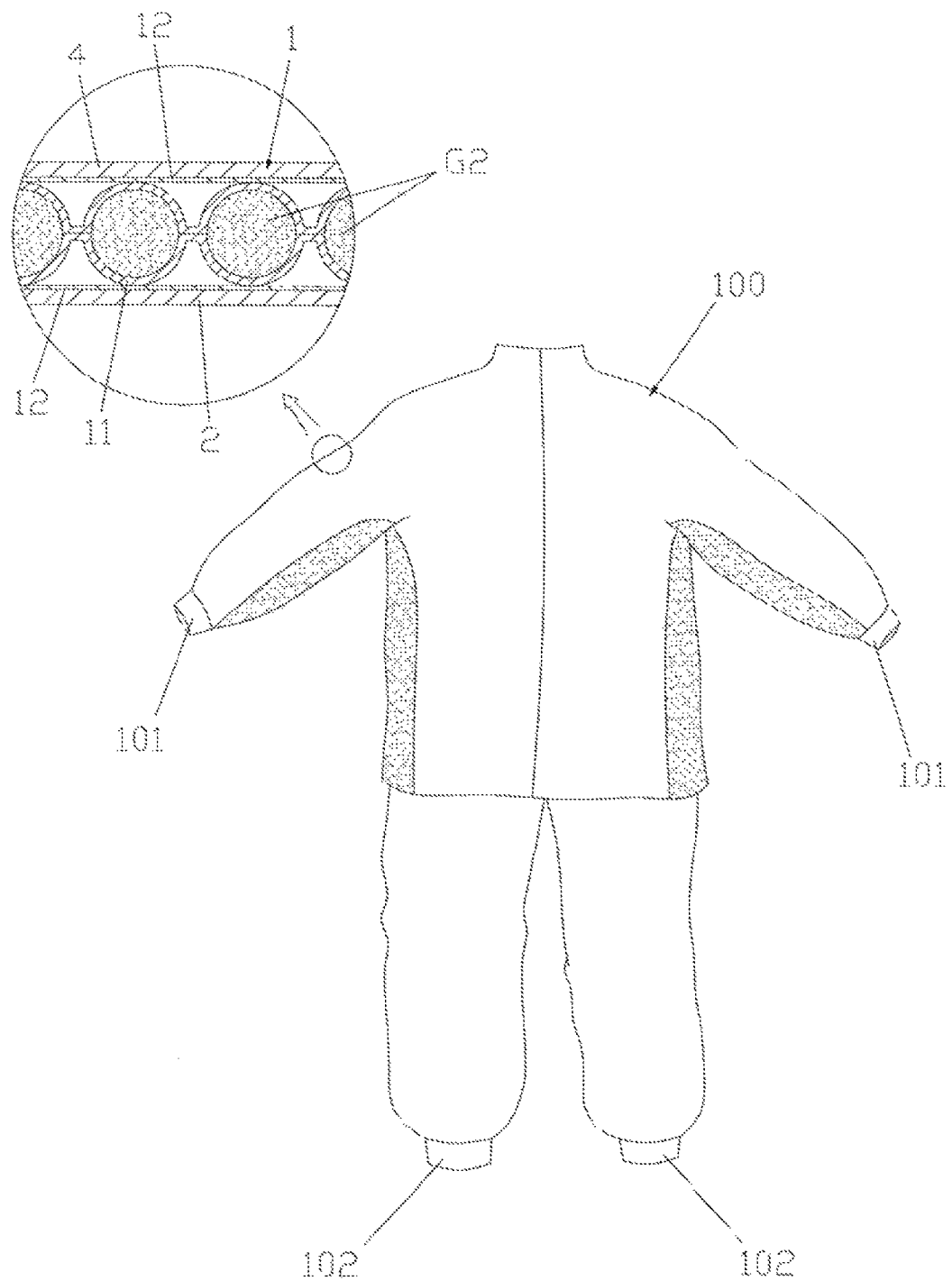

FIG. 4 shows lifesaving clothes including the present cloth in FIG. 1.

DETAILED DESCRIPTIONS

Examples of various embodiments are illustrated in the accompanying drawings and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

Example embodiments will be described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

Hereinafter, embodiments of the present disclosure will be described in details with reference to attached drawings.

As shown in FIG. 1, a cloth A including a gas sheet having multiple individual gas cells formed therein in accordance with one embodiment of the present disclosure may include a gas sheet 1 having multiple individual gas cells 11 formed therein. Each cell 11 may have a sphere shape or sphere-like shape. The gas sheet may have a good stretchability. Each gas cell may have a gas filled therein, and species of the gas may correspond to an application of the present cloth as described below. The gas cells may be continuously connected in a matrix form. The stretchability may be in range of about 200 to 800%, and, to this end, the gas sheet may be made of an elastic material. The present cloth A may further include an inshell 2 and an outshell 3 attached to inner and outer sides of the gas sheet 1 respectively. Textile species of the inshell 2 and outshell 3 may correspond to an application of the present cloth as described below.

The elastic material of the gas sheet 1 may include rubbers or synthetic resins having the stretchability of about 200 to 800%. The elastic material of the gas sheet 1 may include, for example, rubbers such as a synthetic rubber, a synthetic rubber, an oil-resistant rubber, a heat-resistant rubber, a butyl rubber, a thiocol rubber, a chloro-sulfonated polyethylene rubber, a polyurethane rubber, an acryl rubber, a silicon rubber, a viton rubber, and a EPDM (Ethylene Propylene Diene Monomer) rubber; or synthetic resins such as polyurethane, acryl, silicon, polyethylene, polypropylene (PP), polyvinyl chloride (PVC), and polystyrene (CPS) resins. The gas sheet 1 being made of the above listed materials may have a good stretchability, and a tensile strength of about 70 to 200 kg/cm$^2$.

The species of the gas filled in each gas cell 11 of the gas sheet 1 may be suitable for an application of the present cloth. For example, when the present cloth is employed for firefighter clothes, the species of the gas may include a carbonic acid gas. When the present cloth is employed for lifesaving clothes, the species of the gas may include a helium gas. In the present disclosure, the multiple spherical gas cells 11 are connected continuously in a matrix form. In order to improve wearing feeling, the gas sheet 11 may include upper and lower planar vinyl films 12 to sandwich the gas cell 11 therebetween.

The gas cell 11 having the gas filled therein may be formed as follows: first, a pair of suction rollers 301, each roller having multiple gas cell forming grooves 301a, and the each groove having a hemisphere shape, may be provided in a hermetic space 300, and, then, a gas may be injected via a gas inject nozzle 302 into between the pair of suction rollers 301, and, next, the pair of suction rollers 301 may be combined such that the hemispheres of the corresponding grooves 301a are combined to a single spherical cell having the gas filled therein. The present disclosure is not limited thereto. For example, the gas may be filled into the cell 11 using a press mechanism to move upwards and downwards in in a hermetic space.

The inshell 2 on the inner side of the gas sheet 1 may be preferably made of a material to allow the user to feel comfortable wearing. In an alternative, when the present cloth is employed for the firefighter clothes or lifesaving clothes, the inshell 2 on the inner side of the gas sheet 1 may be preferably made of a water-proof material.

The outshell 3 on an outer side of the gas sheet 1 may be made of a textile material corresponding to the application of the present cloth. For example, when the present cloth is employed for the firefighter clothes, the outshell may be made of a woven textile of heat-resistant fibers. When the present cloth is employed for the lifesaving clothes, the outshell may be made of a textile with a floating and/or water-proof function.

As shown in an inset of FIG. 3, a cloth A including a gas sheet having multiple individual gas cells formed therein in accordance with a first embodiment of the present disclosure may include a gas sheet 1 having multiple individual gas cells 11, each gas cell having a sphere shape, each gas cell having a carbonic acid gas G1 filled therein; an aramid-based inshell 2 on an inner side of the gas sheet 1, the inshell being soft and having a good sweat-absorption; and an outshell 3 on an outer side of the gas sheet 1, the outshell being made of a woven textile of PBI (polybenzimidazole) based heat-resistant fibers.

In this embodiment, the elastic material of the gas sheet 1 may be a polyurethane rubber or resin. The polyurethane refers to a collection of polymer compounds having urethane bonds generated by a combination of an alcohol group and an isocyanate group. A representative example thereof may be a spandex made of synthetic fibers. Urethane-based synthetic rubbers may be widely used. The urethane-based synthetic rubber may be polyester-based and polyether-based. The polyester-based urethane based synthetic rubber may be formed by reacting an ethylene glycol and an propylene glycol with an adipic acid to form a polyester, and then by urethanating the polyester having a molecular weight of up to 3,000 and having a OH group at both ends using a naphthalene-1, 5-diisocyanic acid, and, at the same time, by polymerizing the resultant product. The polyether-based urethane based synthetic rubber may be formed by forming an polyether via a mixture between a propylene oxide and an ethylene oxide, and by reacting OH groups at both ends of the polyether with a toluylene diisocyanic acid to form a polyurethane with a high molecular weight. Those polyurethanes may be used for a material of the gas sheet to exhibit a good tensile strength and stretchability. The present disclosure is not limited thereto. The polyethylene may be used for a material of the gas sheet. The polyethylene may be formed by separating a naphtha (100 to 200° C.) from an crude oil via a distillation and by decomposing the naphtha to form an about 25% ethylene, and, then, by polymerizing the ethylene. A variety of different types of polyethylene may be formed based on the polymerization methods. The polyethylene may be classified mainly into a low-density (soft) polyethylene and a high-density (hard) polyethylene. The low-density (soft) polyethylene may be preferable for the material of the gas sheet. The low-density polyethylene may be produced via heating at at least 1,000 atm, and at least 200° C. using a trace of air as a catalyst. Thus, the low-density polyethylene may be generally referred to as a high-pressure polyethylene, and may have about a 0.91 density. Since the low-density polyethylene has branches, an amount of a molecular array thereof is not sufficient. Further, a crystallized proportion thereof is about 65%, and, thus, the low-density polyethylene is soft and has a great stretchability. The low-density polyethylene has a low tensile strength but a high shock-resistance.

In this embodiment, when the present cloth is employed for the firefighter clothes, the gas sheet may be made of the polyurethane with a poor heat-resistant property, which, thus, may be ruptured at a temperature above 100° C. However, the present disclosure is not limited thereto. The present gas sheet may be made of a thermoplastic synthetic resin such as a polyethylene (PE), a polypropylene (PP), a polyvinyl chloride (PVC), and a polystyrene (CPS). Such thermoplastic synthetic resins are already known. Thus, such thermoplastic synthetic resins may enable the gas sheet 1 to have an excellent elastic restoring force.

Regarding the polyurethane, a soft polyurethane may be employed for the gas sheet. The soft polyurethane may enable the gas sheet to have the good cushioning property, stretchability, tensile strength, and wear-resistance.

In one embodiment, each gas cell 11 of the gas sheet 1 may have a spheric hollow gas cell film to define a gas receiving space therein. The thickness of the spheric hollow gas cell film may vary depending on materials of a synthetic resin thereof. The thickness of the spheric hollow gas cell film may be in a range between about 0.05 mm and about 0.9 mm. A diameter of each gas cell 11 may be in a range between about 2 mm and about 15 mm. The diameter of each gas cell 11 may vary depending on the application of the present cloth. In this connection, when the present cloth is required to have a high tensile strength, the diameter of each gas cell 11 may be larger and the thickness of the spheric hollow gas cell film may be larger.

In this embodiment, the thickness of the spheric hollow gas cell film may be about 0.2 mm, and the diameter of each gas cell 11 may be about 3 mm. This is merely exemplary. The present disclosure is not limited thereto. As mentioned above, the thickness of the spheric hollow gas cell film and the diameter of each gas cell 11 may vary depending on the applications of the present cloth.

In the first embodiment, the gas cell 11 may contain the carbonic acid gas G1 filled therein. The carbonic acid gas may refer to a carbon dioxide gas which may act as a coolant. Thus, as shown in FIG. 3, when the present cloth A is employed for the firefighter clothes 100, the spheric hollow gas cell film made of the polyurethane (being ruptured above 100° C.) may be ruptured in the event of the fire, especially, when being exposed to the very hot temperature, for example, above 100° C., and, thus, the carbonic acid gas may be discharged out of the cells to act as a coolant. In this connection, since the gas cells 11 are individually formed, the rupture of the gas cells 11 may individually occur. Before the gas cells 11 are ruptured, the gas cells may absorb the external shock via the deformation thereof to act as good shock-buffering or cushioning means.

In this embodiment, before the gas cells 11 are ruptured, the gas sheet 1 may bear a load 300 kgf/cm$^2$. Thus, it may be proved that, before the gas cells 11 are ruptured, the gas cells sufficiently absorb the external shock via the deformation thereof to act as good shock-buffering or cushioning means. In this connection, since the gas cells 11 are arranged in a matrix form, the gas sheet 1 may bear a load 500 kgf/cm$^2$ larger than the above load 300 kgf/cm$^2$.

Although, in this embodiment, the inshell is made of an aramid-based material, the inshell 2 may be made of a fabric material including a laminate textile.

In this embodiment, the outshell 3 may be made partially (at least 30%) or entirely of a woven textile of PBI (polybenzimidazole) based fibers, PBO (Polybenz oxazole) based fibers, or equivalent higher-graded fibers. This may allow the outshell 3 to have a great heat-resistance. The inshell 2 contacting a skin of the wearer may be made of aramid-based fibers or equivalent higher-graded fibers to be soft and have a good sweat-absorption.

In a second embodiment of the present disclosure, the cloth A including the gas sheet having multiple individual gas cells formed therein in accordance with the present disclosure may be employed for the lifesaving cloth. As shown in FIG. 4, the cloth A including the gas sheet having multiple individual gas cells formed therein in accordance with the second embodiment of the present disclosure may include a gas sheet 1 having multiple individual gas cells 11 formed therein, each cell having substantially a sphere shape, wherein the multiple gas cells 11 each contains the helium gas G2 filled therein. In this embodiment, the inshell 2 may be made of aramid-based fibers or equivalent higher-graded fibers to be soft and have a good sweat-absorption. Further, the outshell 3 may be made of a floating and/or water-proof woven textile. In case of the floating textile, the outshell may be made of a woven textile of water-floating fibers including core fibers having a larger specific gravity than water, and coating layers on the core fibers, the coating layers containing at least about 90 to 99% of a water-floating material. In this embodiment, the gas sheet 1 may be made of an oil-resistant rubber to prevent water from penetrating therein.

When the outshell is made of the woven textile of the water-floating fibers including the core fibers having a larger specific gravity than water, and the coating layers on the core fibers, the coating layers containing at least about 90 to 99% of the water-floating material, the water-floating material of the coating layers may be an oil which has a water repellent property. Thus, the water-floating fibers having thereon the coating layers containing at least about 90 to 99% of the water-floating material may not permeable by water. Thus, an air layer in the water-floating fibers may not be occupied with water, leading to a maximized floating force. However, the present disclosure is not limited thereto. That is, the outshell may not be made of the woven textile of the above-defined water-floating fibers, but may be made of a general water-proof fabric or general outshell material.

As shown in FIG. 4, the lifesaving clothes 100 using the cloth A in accordance with the second embodiment of the present disclosure may have sleeves 101 and/or pants bottoms 102 closed at free ends thereof using elastic rings such as rubber rings. In this way, when the lifesaving clothes 100 contacts water in a long time, the lifesaving cloth 100 may not be permeable by water. Further, the gas cell 11 of the gas sheet 1 may thermally-isolate the body of the wearer from the external environment, thereby to prevent the heat of the body from transferring to the external environment, and, thus, to suppress hypothermia of the wearer.

In this way, as in the first embodiment where the present cloth is employed for the firefighter clothes, in an event of the fire, the cells of the present cloth may be ruptured, and, thus, the carbonic acid gas may be discharged out of the cell to act as the heat-blocking agent or cooling agent. Further, as in the second embodiment where the present cloth is employed for the lifeguard clothes or life jacket, the helium gas in the cell may be maintained to act as the water-floating agent to facilitate the person wearing the clothes to be floated on the water. Furthermore, the gas cell may thermally-isolate the body of the wearer from the external environment, thereby to prevent the heat of the body from transferring to the external environment, and, thus, to suppress hypothermia of the wearer.

The present cloth may be massively or reproducedly manufactured in a general cloth manufacturing process, thereby to have an industrialability.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

What is claimed is:

1. A cloth comprising:
a gas sheet having multiple individual gas cells formed therein, each cell having substantially a sphere shape, the gas sheet being made of an elastic material and having a stretchability of about 200 to 800%, each gas cell having a gas filled therein, species of the gas corresponding to an application of the cloth, the gas cells being continuously connected in a matrix form; and
an inshell and an outshell attached to inner and outer sides of the gas sheet respectively, wherein textile species of the inshell and outshell correspond to an application of the cloth,
wherein the species of the gas includes a carbonic acid gas, wherein the textile species of the inshell includes a fabric, and the textile species of the outshell includes a woven textile of heat-resistance fibers.

2. The cloth of claim 1, wherein the elastic material includes at least one selected from a group consisting of a rubber, a synthetic rubber, an oil-resistant rubber, a heat-resistant rubber, a butyl rubber, a thiocol rubber, a chlorosulfonated polyethylene rubber, a polyurethane rubber, an acryl rubber, a silicon rubber, a viton rubber, a EPDM (Ethylene Propylene Diene Monomer) rubber, a polyurethane resin, a acryl resin, a silicon resin, a polyethylene resin, a polypropylene (PP) resin, a polyvinyl chloride (PVC) resin, and a polystyrene (CPS) resin.

3. The cloth of claim 1, wherein each gas cell has a spheric hollow gas cell film to define a gas receiving space therein, wherein a thickness of the spheric hollow gas cell film is in a range between about 0.05 mm and about 0.9 mm, wherein a diameter of each gas cell is a range between about 2 mm and about 15 mm.

4. The cloth of claim 2, wherein each gas cell has a spheric hollow gas cell film to define a gas receiving space therein, wherein a thickness of the spheric hollow gas cell film is in a range between about 0.05 mm and about 0.9 mm, wherein a diameter of each gas cell is a range between about 2 mm and about 15.

5. A cloth comprising:
a gas sheet having multiple individual gas cells formed therein, each cell having substantially a sphere shape, the gas sheet being made of an elastic material and having a stretchability of about 200 to 800%, each gas cell having a gas filled therein, species of the gas corresponding to an application of the cloth, the gas cells being continuously connected in a matrix form; and
an inshell and an outshell attached to inner and outer sides of the gas sheet respectively, wherein textile species of the inshell and outshell correspond to an application of the cloth,
wherein the species of the gas includes a helium gas, wherein the textile species of the inshell includes a fabric, and the textile species of the outshell includes a water-proof fabric.

6. A cloth comprising:
a gas sheet having multiple individual gas cells formed therein, each cell having substantially a sphere shape, the gas sheet being made of an elastic material and having a stretchability of about 200 to 800%, each gas cell having a gas filled therein, species of the gas corresponding to an application of the cloth, the gas cells being continuously connected in a matrix form; and
an inshell and an outshell attached to inner and outer sides of the gas sheet respectively, wherein textile species of the inshell and outshell correspond to an application of the cloth,
wherein the species of the gas includes a helium gas, wherein the textile species of the inshell includes a fabric, and the textile species of the outshell includes a water-floating fabric.

7. The cloth of claim 5, wherein the elastic material includes at least one selected from a group consisting of a rubber, a synthetic rubber, an oil-resistant rubber, a heat-resistant rubber, a butyl rubber, a thiocol rubber, a chlorosulfonated polyethylene rubber, a polyurethane rubber, an acryl rubber, a silicon rubber, a viton rubber, a EPDM (Ethylene Propylene Diene Monomer) rubber, a polyurethane resin, a acryl resin, a silicon resin, a polyethvlene resin, a polypropylene (PP) resin, a polyvinyl chloride (PVC) resin, and a polystyrene (CPS) resin.

8. The cloth of claim 5, wherein each gas cell has a spheric hollow gas cell film to define a gas receiving space therein, wherein a thickness of the spheric hollow gas cell film is in a range between about 0.05 mm and about 0.9 mm, wherein a diameter of each gas cell is a range between about 2 mm and about 15 mm.

9. The cloth of claim 6, wherein the elastic material includes at least one selected from a group consisting of a rubber, a synthetic rubber, an oil-resistant rubber, a heat-resistant rubber, a butyl rubber, a thiocol rubber, a chlorosulfonated polyethylene rubber, a polyurethane rubber, an acryl rubber, a silicon rubber, a viton rubber, a EPDM (Ethylene Propylene Diene Monomer) rubber, a polyurethane resin, a acryl resin, a silicon resin, a polyethylene resin, a polypropylene (PP) resin, a polyvinyl chloride (PVC) resin, and a polystyrene (CPS) resin.

10. The cloth of claim 6, wherein each gas cell has a spheric hollow gas cell film to define a gas receiving space therein, wherein a thickness of the spheric hollow gas cell film is in a range between about 0.05 mm and about 0.9 mm, wherein a diameter of each gas cell is a range between about 2 mm and about 15 mm.

* * * * *